United States Patent
Hsu

[19]

[11] Patent Number: 5,937,088
[45] Date of Patent: *Aug. 10, 1999

[54] APPARATUS AND METHOD FOR IMPROVING MEMORY USAGE OF LOOK-UP TABLE MAPPING

[75] Inventor: Chuan-Yu Hsu, Hsinchu, Taiwan

[73] Assignee: Umax Data Systems, Inc., Hsinchu, Taiwan

[ * ] Notice: This patent issued on a continued prosecution application filed under 37 CFR 1.53(d), and is subject to the twenty year patent term provisions of 35 U.S.C. 154(a)(2).

[21] Appl. No.: 08/671,185

[22] Filed: Jun. 27, 1996

[51] Int. Cl.$^6$ ....................................................... H04N 1/60
[52] U.S. Cl. ............................ 382/167; 358/517; 358/520
[58] Field of Search ...................... 358/517, 518, 358/519, 520, 521, 523, 524; 382/162, 167, 515, 232; 345/509, 191, 199; H04N 1/60

[56] References Cited

U.S. PATENT DOCUMENTS 5,506,946  4/1996  Bar et al. .
5,781,903  7/1998  Rusterholz .............................. 382/232

*Primary Examiner*—Kim Yen Vu
*Attorney, Agent, or Firm*—Pennie & Edmonds LLP

[57] ABSTRACT

An improved apparatus for reducing memory usage of look-up table mapping in an imaging system, a method related to the apparatus is also disclosed. The apparatus receives a digital input signal and processes it through a two-step mapping procedures instead of conventional skill that it uses only one look-up table, each procedure provides a series of mapping outputs. A comparing unit composed of a lot of logical gates is then comparing those mappings with original input signal and choosing the best one for preparing a final output. Finally, a final output corresponding to the best choice is providing for displaying.

15 Claims, 5 Drawing Sheets

APPARATUS AND METHOD FOR IMPROVING MEMORY USAGE OF LOOK-UP TABLE MAPPING

BACKGROUND OF THE INVENTION

1. Field of the Invention

The present invention relates to an imaging system, and more particularly to an apparatus for look-up table mapping in a scanning system to improve efficiency in memory usage, furthermore, to apply to a real-time scanning system without loss accuracy of system.

2. Description of the Prior Art

Up-to-date, there are more and more applications about imaging systems, such as camera and scanner, etc.. As the computer technology and the like are getting more and more progress, it seems impossibly to fit human beings' desire. In recent years, the difference between the computer world and the real is fast vanishing, parts of it appears in imaging systems that images generated by an imaging system are from binary through gray-scales to color though people do not exactly feel this change that is happening each day.

Although it is a requirement that an imaging system is capable of imaging a picture in a manner with higher accuracy and resolution, more additional arithmetical operations are required to process such a great deal of image information. In a scanning system, there are lots of important tasks must be processed such as image processing, γ-correction, and high-light shadow, etc.. It is impossible for a scanner to complete such a great deal of tasks in a short time interval only by using hardware implementations even if it contains a powerful CPU (central processing unit) of Pentium-series. It goes without saying that a scanner can complete them as a real-time system. There are some schemes for overcoming the difficulty. One famous method of them is to use a look-up table that it is known as a popular skill in this art. There stores predetermined mapping information in a look-up table that follows a curve (usually, a monotone curve is chosen), and acts as a memory to provide an output each time when it receives an address. All skilled in the art know that this method is flexible, fast, and easy to implement in a real time manner, however, its disadvantages in performance are seldom under our considerations. One of these disadvantages is, while an input signal has more bits than ever, and the size of look-up table will increase incredibly.

It is seldom over 10 bits for an output signal in a scanning system owing to the visual of human being is insensitive to detail color differences. Typically, 8 bits for each output signal is enough for displaying. While we increase the bits of an input signal that increases the size of look-up table it will also result a look-up table to contain a lot of redundant mapping terms. Using FIG. I to simply describe this situation: an input signal follows the format of 16-bits per pixel and 8-bits per pixel for an output signal. Clearly, about 256 input signals map into an identity mapping terms on an average, that is, about 255 mapping items seem redundantly in the table. Moreover, if we choose the traditional skill that uses only one look-up table, at least a $2^x \times 8$ memory (that is, a 64 KBytes memory) is necessary for storing the mapping information. Obviously, we hardly can find an ASIC chip containing such a great deal of memory storage, up-to-date (although it should not remain a problem in the future). The present invention just suggests an improvement related to this disadvantage.

SUMMARY OF THE INVENTION

It is the principal object of the present invention to provide an imaging system to be capable of efficiently reducing memory usage while the scheme of look-up table mapping is applied.

Because conventional skill in look-up table mapping is not so efficient while the bits contained in an input signal is more than ever, more memory storage is required for storing the mapping information. Furthermore, there needs an extra memory usage for storing a lot of redundant mapping terms. A more efficient skill is urgent desiring. The present invention suggests a two-step mapping apparatus to overcome this disadvantage, and only need to increase a little bit of logical gates.

According to the present invention, there provides a two-step mapping method accompanied by two look-up tables: a first look-up table stores the predetermined mapping information that follows a monotone curve, and a second look-up table stores the predetermined mapping information that follows the inverse function of the monotone curve used in first look-up table. A series of comparing procedures are then processed by means of the operations of the additional logical gate for providing a final output.

In operations, an input signal is masked to remain part of the input signal. The remainder parts then seems as an address of the first look-up table to map out a series of first-step mapping outputs. Again, these first-step mapping outputs then seem as addresses of the second look-up table to sequentially map out a series of second-step mapping outputs. A lot of series comparing procedures are then processing to compute the distance between each second-step mapping output and the original input signal, and to find the minimum among these distances. While obtaining the minimum distance, the first-step mapping output that causes the second-step mapping output having the minimum distance with original input signal is routed as the final output.

BRIEF DESCRIPTION OF THE DRAWINGS

Preferred embodiments of the invention will now be described in connection with the accompanying drawings, in which.

DESCRIPTION OF THE PREFERRED EMBODIMENT

A preferred embodiment of the present invention will be described hereinafter.

Figure 1:
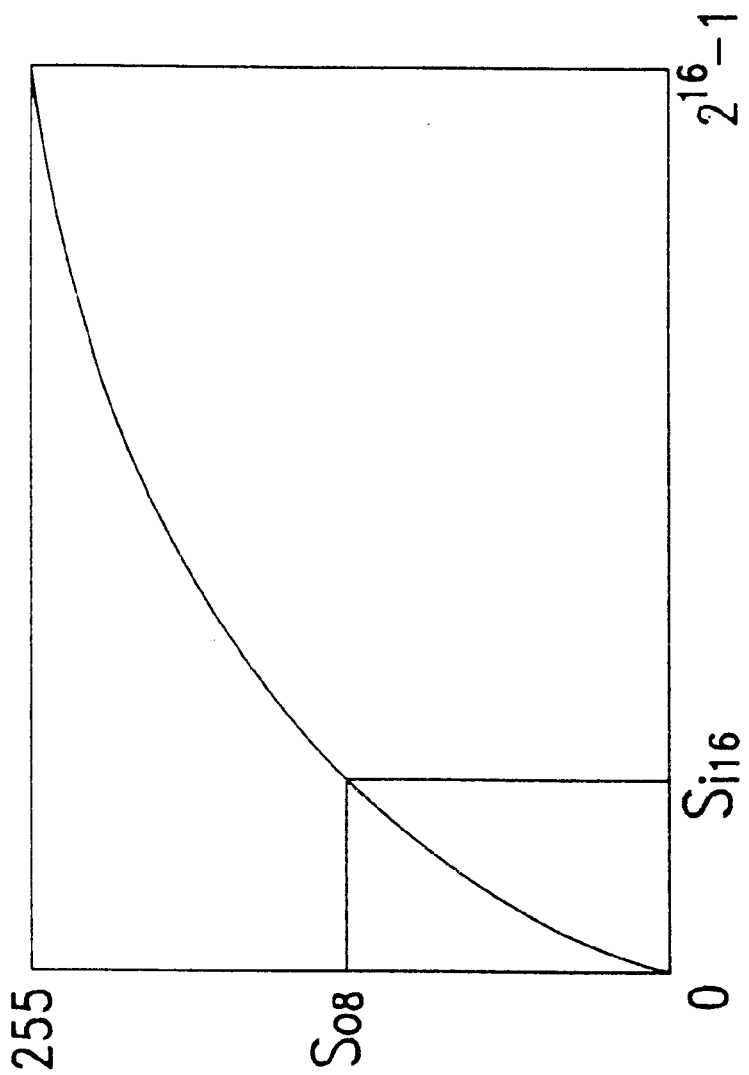
FIG. 1 represents the situation while input signal contains more bits than ever, and the conventional skill is applied.
Figure 2:
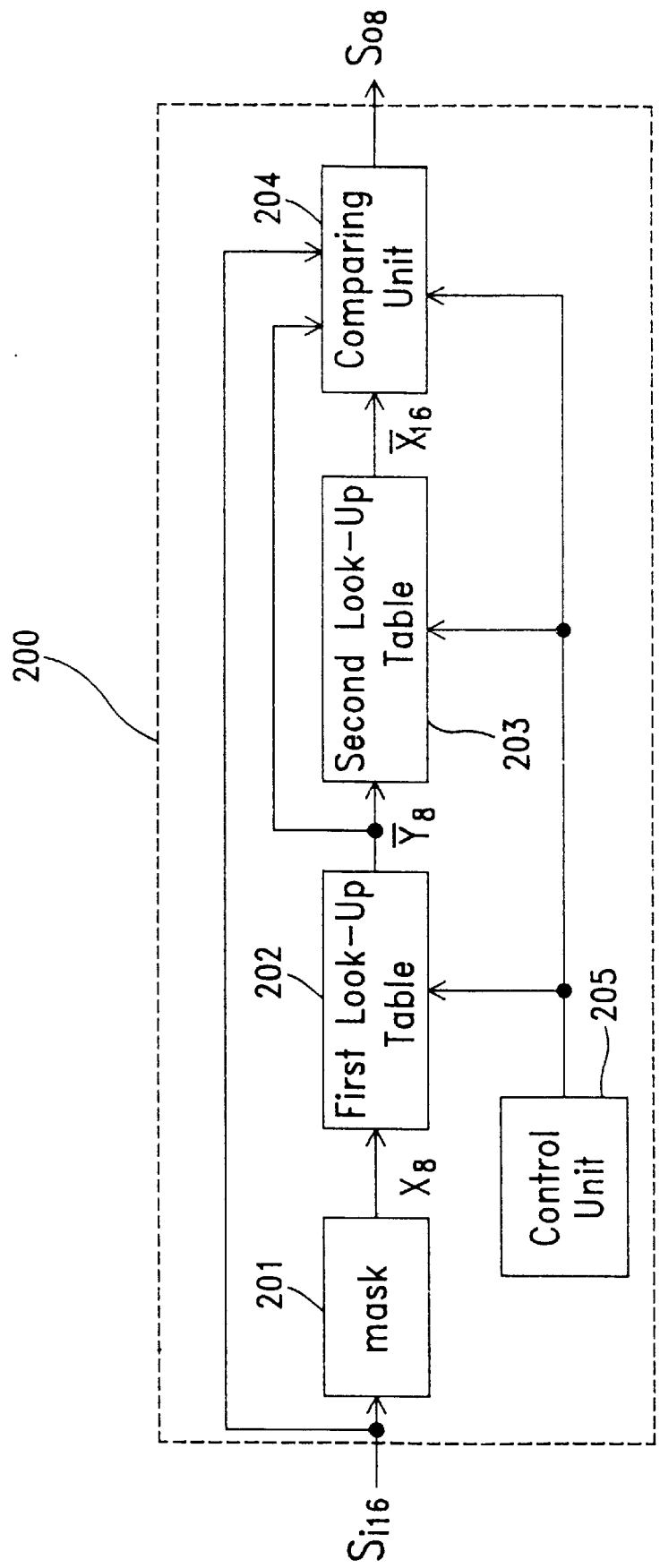
FIG. 2 represents a block diagram of preferred embodiment according to the invention.

FIG. 2 represents a block diagram of the improved look-up table mapping apparatus 200 according to the present invention. The apparatus 200 comprises a mask 201 for receiving a 16-bits input signal $Si_{16}$ and then removing the lower byte of the input signal $S_{16}$ but remaining the upper byte $X_8$. Hereinafter, all subscripts represent the bits contained in a signal. A first look-up table 202 stores the predetermined mapping information derived from a monotone curve. The first look-up table 202 receives the upper byte $X_8$ of the input signal $Si_{16}$ to provide a series of first-mapping outputs $\overline{Y}_8$. A second look-up table 203 stores the predetermined mapping information derived from a monotone curve that is the inverse function of the monotone curve used in the first look-up table. The second look-up table 203 receives the first-mapping outputs $\overline{Y}_8$ and provides a series of second-step mapping outputs $\overline{X}_{16}$. A comparing unit 204 composed of a lot of logical gates receives the original input signal $Si_6$, the first-mapping outputs $\overline{Y}_8$, and the second-step mapping outputs $\overline{X}_{16}$ to provide a final output $So_8$, control unit 205 generates control signals to the first look-up table 202 and the second look-up table 203 for controlling mapping actions, and generates control signals to the comparing unit 204 for controlling a sequential of comparing procedures to provide a final output $So_8$. Hereinafter, each time when a signal with an upperbar over it implies that there is a series of outputs containing in the signal.

Figure 3:
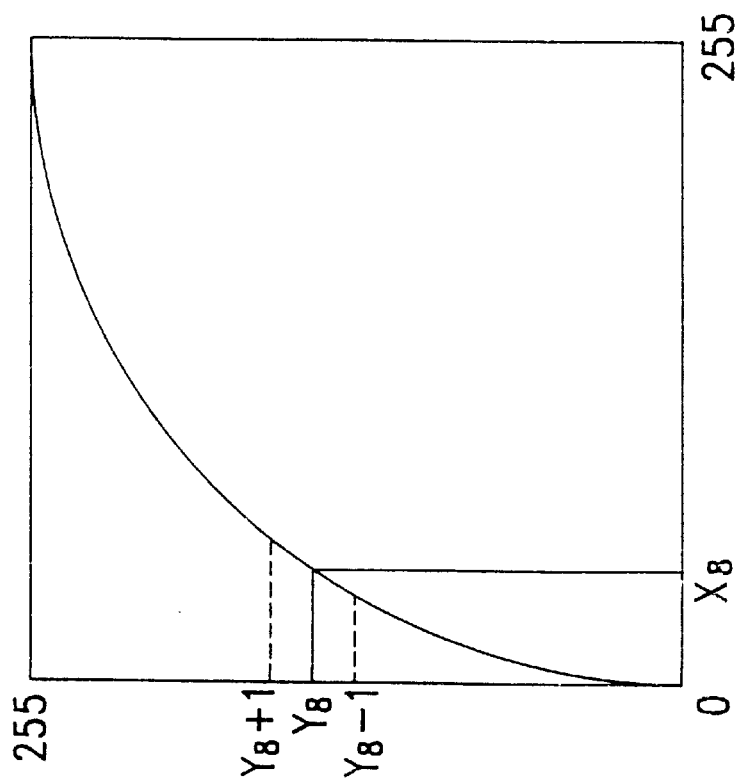
FIG. 3 represents a look-up table used in first-step mapping.

Each time when an input signal $Si_{16}$ arrives the mask 201 truncates its lower byte and then provides the upper byte $X_8$ to the first look-up table 202. The first look-up table 202 receives $X_8$ and regards it as an address to map out a series of first-step mapping outputs. In FIG. 2, there uses $\overline{Y}_8$ to simply represent these first-step mappings outputs $Y_8^-$, $Y_8$, and $Y_8^+$. There are three parts of outputs containing in $\overline{Y}_8$. $Y_8$ represents the direct 8-bits mapping output corresponding to $X_8$; $Y_8^+$ represents an 8-bits mapping output that is the next adjacent value of the $Y_8$ in the first look-up table 202. Finally, $Y_8$ represents an 8-bits mapping output that is the last adjacent value of the $Y_8$ in the first look-up table 202. For example: if $Y_8$ is equal to 100, then $Y_8^-$ is 99 and $Y_8^+$ is 101. FIG. 3 describes the relationships among $Y_8^-$, $Y_8$, and $Y_8^+$. In other words, an address of first look-up table 202 will cause three first-step mapping outputs. To complete this, the control unit 205 must provide three times of read enabling signals to the first look-up table 202 to read out $Y_8^-$, $Y_8$, and $Y_8^+$ each time when an "address" $X_8$ arrives.

Figure 4:
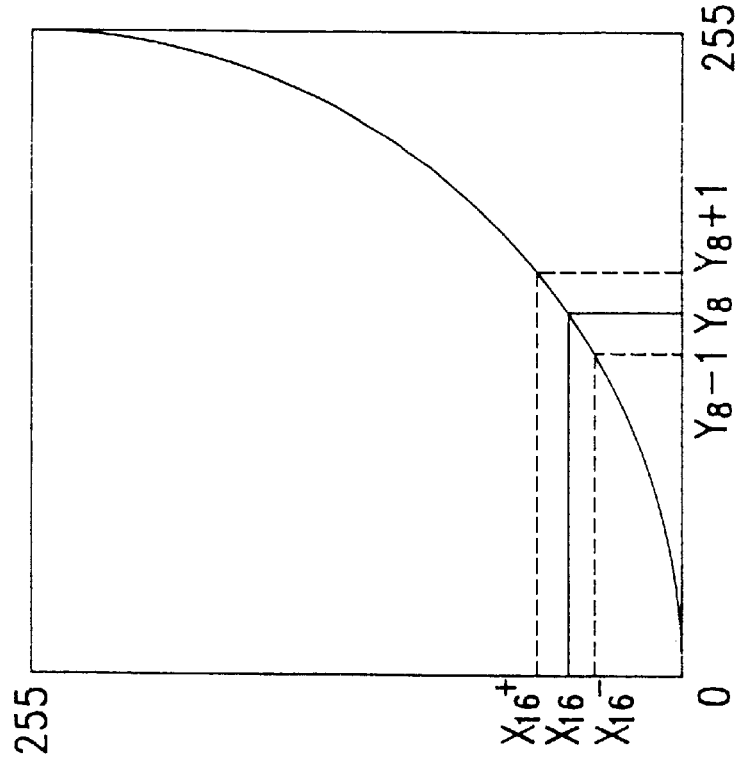
FIG. 4 represents a look-up table used in second-step mapping.

Referring to FIG. 4, it is obvious that $Y_8^-$, $Y_8$, and $Y_8^+$ are regarded as addresses of the second look-up table 203, and a series of 16-bits outputs $\overline{X}_{16}$ (including $X_{16}^-$, $X_{16}$, and $X_{16}^+$) are mapped out corresponding to $\overline{Y}_8$ (including $Y_8^-$, $Y_8$, and $Y_8^+$). That is, a series of 16-bits outputs $X_{16}^-$, $X_{16}$, and $X_{16}^+$ are mapped out by using $Y_8^-$, $Y_8$, and $Y_8^+$, respectively. Note again that the monotone curve used in the second look-up table 203 must be the inverting function of the one used in the first look-up table 202. This is the reason why a constraint that a monotone curve is used in these look-up tables must be held. In addition, $X_{16}^-$, $X_{16}$, and $X_{16}^+$ may not be adjacently connected as the relationships among $Y_8^-$, $Y_8$, and $Y_8^+$. The control unit 205 is capable of easily controlling the series mapping actions because it just follows the conventional steps of memory mappings. All second-step mapping outputs $\overline{X}_{16}$ are then sequentially provided to the comparing unit 204 for further processing.

Figure 5:
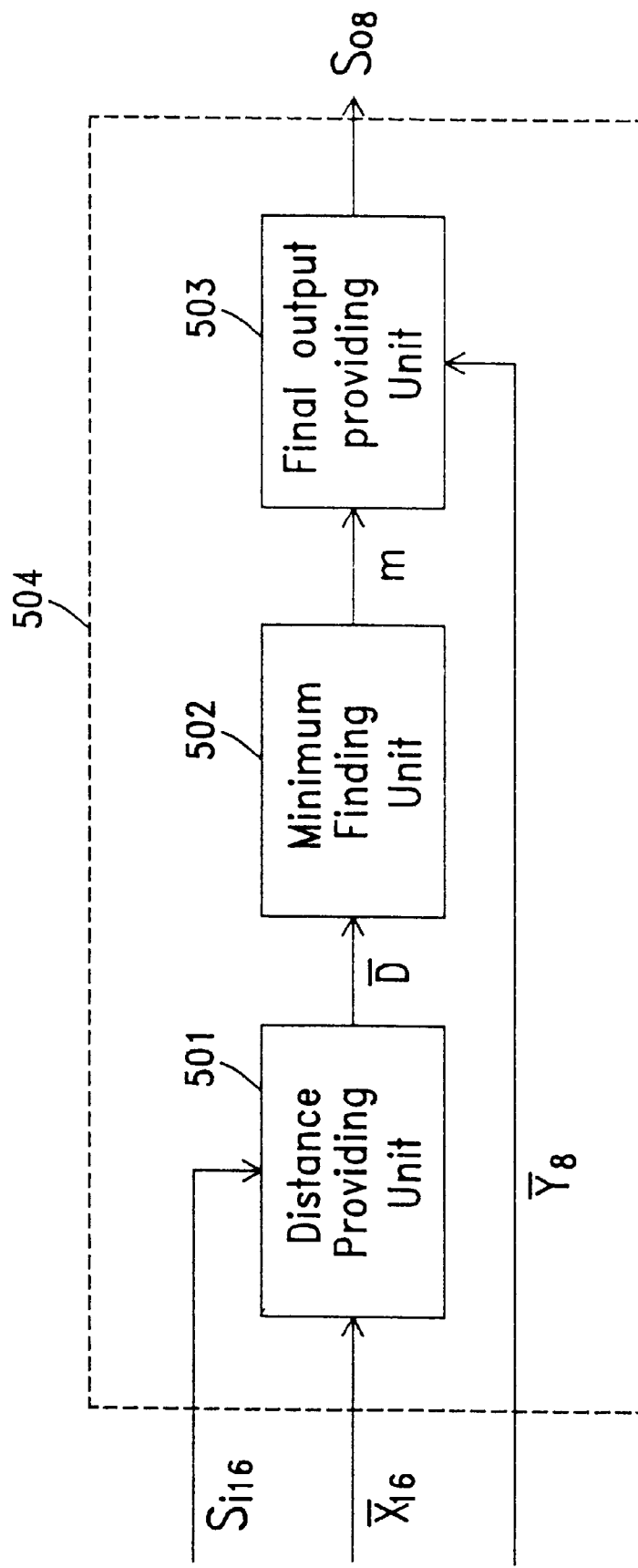
FIG. 5 represents a block diagram showing the configuration of a comparing unit of the preferred embodiment.

FIG. 5 describes a more detail configuration of the comparing unit 205. Obviously, the comparing unit 205 comprises three principal elements described following. A distance providing unit 501 receives the original input signal $Si_{16}$ and the second-step mapping output $\overline{X}_{16}$ to calculate the distance between each second-step mapping output and the original input signal $Si_{16}$. So-called distance here is defined as the absolute value of the difference between a second-step mapping output and the original input signal $Si_{16}$. A series of distances $\overline{D}$ are then routing out. A minimum providing unit 502 receives the distances $\overline{D}$ to determine the minimum distance m among $\overline{D}$. The minimum distance m is then provided. A final output providing unit 503 receives the minimum distance m and the first-step mapping outputs $\overline{Y}_8$. Finally, output $So_8$ by means of the minimum distance m.

Figure 6:
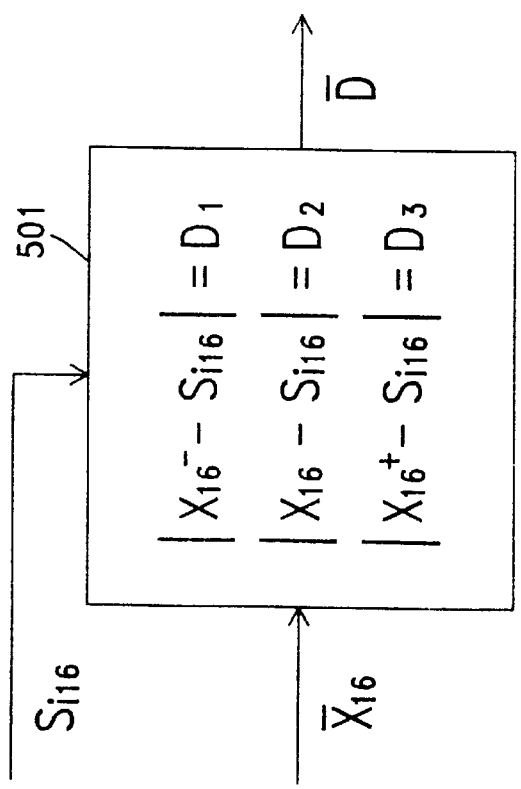
FIG. 6 describes the operations of a distance providing unit in the comparing unit.

In operations, $X_{16}^-$, $X_{16}$, and $X_{16}^+$ can be separately applied to find their distances with the original input signal $Si_{16}$ in the distance providing unit 501, and named these distances to be $D^-$, $D$, and $D^+$, respectively. In FIG. 5, there uses a symbol $\overline{D}$ to simply represent these three distances, $D^-$, $D$, and $D^+$. FIG. 6 describes the operations of the distance providing unit 501. For example: the absolute value of the difference between $X_{16}^-$ and $Si_{16}$ is defined as $D^-$, i.e., $|X_{16}^- - Si_{16}|32\ D^-$. These distances $\overline{D}$ are then routed to the minimum providing unit 502 to determine the minimum distance m. The minimum distance m is then routed to the final output providing unit 503. There still needs the first-step mapping output $\overline{Y}_8$ (i.e. $Y_8^-$, $Y_8$, and $Y_8^+$) for the final output providing unit 503 to decide the final output $So_8$.

Figure 7:
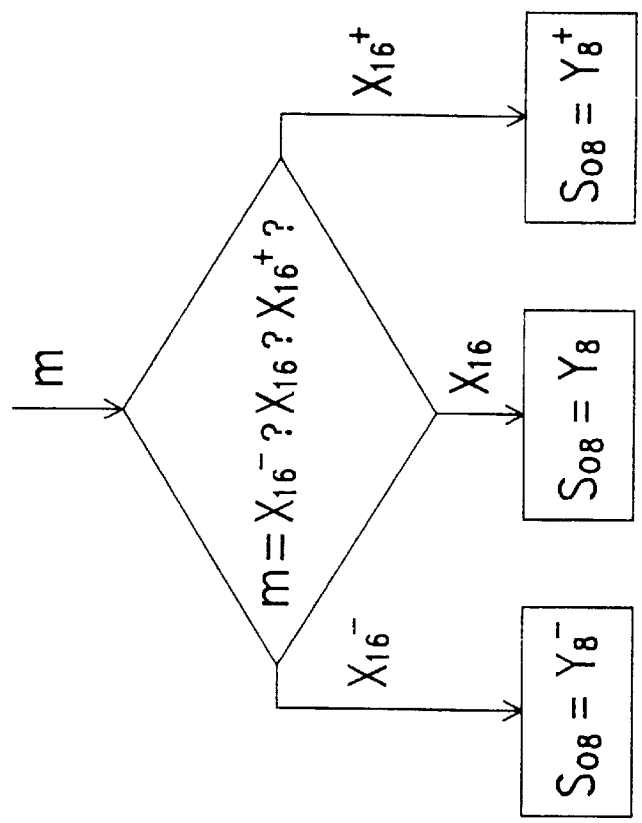
FIG. 7 describes the operations of a final output providing unit in the comparing unit.

After finding the minimum distance m, the final output $So_8$ is fixed by providing the first-step mapping output that results the second-step mapping output having the minimum distance m. FIG. 7 describes the operations of the final output providing unit 503. For example: if D is the minimum distance, then $Y_8$ will become the final output $So_8$ because $Y_8$ results the second-step mapping output $X_{16}$ with the minimum distance m.

However, traditional circuit designs can easily implement these tasks of the comparing unit 204, such as performing a subtraction operation between two values, and calculating the absolute value for a number by comparing its sign bit, etc.. There are a lot of ready-made logical gates for performing these tasks.

One thing must note here is that it is necessary for the first look-up table 202 to provide three series first-step mapping outputs $\overline{Y}_8$ when the $X_8$ arrives. If only a first-step mapping output is used, and assuming the first-step mapping output to be $Y_8$, the direct mapping output $Y_8$ with respect to $X_8$ may be an improper output. It should be noted that when only parts of an input signal is applied mapping that it may cause more deviations, especially when the truncating and/or rounding operations are unavoidable. A reasonable way is to apply a series of neighboring first-step mapping outputs $\overline{Y}_8$ instead of only the $Y_8$ to be addresses of a second look-up table to inverting-functionally map out a series of second-step mapping outputs $\overline{X}_{16}$. The $\overline{X}_{16}$ then compare with the original input signal $Si_{16}$ to determine which one is most closed to $Si_{16}$. It may be a better choice that provides the one among $\overline{Y}_8$ resulting its second-step mapping most closed to $Si_{16}$ than direct provides $Y_8$ without another comparing procedures.

While the scheme of the present invention is completely describing, a table following simply compares the memory usage between conventional skill and the new scheme according to the present invention:

| | Conventional Skill (bits) | New Scheme (bits) |
|---|---|---|
| m = 9, n = 8 | 512 × 8 = 4096 | 256 × 9 + 256 × 8 = 4352 |
| m = 10, n = 8 | 1024 × 8 = 8192 | 256 × 10 + 256 × 8 = 4608 |
| m = 12, n = 8 | 4096 × 8 = 32768 | 256 × 12 + 256 × 8 = 5120 |
| m = 16, n = 8 | 64 × 1024 × 8 = 524288 | 256 × 16 + 256 × 8 = 6144 |
| m = 16, n = 12 | 64 × 1024 × 12 = 786432 | 256 × 16 + 4096 × 12 = 114688 | where m represents the bit number of an input signal and n represents the bit number of an output signal. Because the visual of human being is insensitive to detail color differences, the bit number of an output signal is seldom over 10 bits. Typical number is 8 bits.

As can be seemed in the table above, while the bit number of an input signal is almost the same with the bit number of an output signal (ex.: (m−n)≦1), the suggested new scheme goes invalid because it causes the memory usage more than conventional skill. The information of the first row in the above table shows the truth that when an input signal contains 9 bits and an output signal contains 8 bits. That is conventional skill requires 4096 bits of memory but new scheme requires 4352 bits. In fact, not only the memory usage is less efficient than conventional skill, but more hardware operations are required when the new scheme is applied.

As contrast with the first row of the above table, the information of those remaining rows tell us another truth that the new scheme is powerful as long as the bit number of an input signal is larger than the bit number of an output signal. Typically, the difference between m and n must at least be 2(i.e. (m−n)≧2). For example: the fourth row of the above table describes that while an input signal contains 16 bits and an output signal contains only 8 bits, the conventional skill requires a tremendous usage of memory, 524,288 (512K)bits! In the same time, the new scheme only requires 6144 (6K) bits of memory. This proves that the new scheme is more powerful than conventional skill, especially when the difference bit number between the input and output signal is more than 2 bits.

However, the more difference between m (bits in an input signal) and n (bits in an output signal), the more efficient to memory usage we obtain. This also holds the proof of the information through the second row to the fourth row of the above table. Clearly the situation describing in third row of the above table is more efficient in memory usage than the situation describing in the second row.( because we save 32768−5120=27648 bits in the third row'situation but only save 8192−4608=3584 bits in the second row') A similar event appears between the fourth row and the second row except more memory bits are saved. (in fourth row, 524288−6144=518144 bits are saved but only 3584 bits are saved in the second row')

As the present invention has been described with preferred embodiment it will be obviously to those skilled in the art that various modifications may be made. For example, the minimum providing unit and the final output providing unit in the comparing unit can be combined together for receiving the distances and first-step mappings and providing a final output; the minimum distance can be replaced by other symbol for clearly indicating the first-step mapping that raises the minimum distance. These variations to the described embodiment of the present invention, the scope of which is limited by the following claims.

What is claimed is:

1. A look-up table mapping apparatus for reducing memory usage of a scanning apparatus; said mapping apparatus comprises:

masking means responsive to an input signal for of said input signal and then outputting said portions of said input signal that is not cleared;

first mapping means responsive to said portions of said input signal that is not cleared for generating a plurality of first-step mapping outputs;

second mapping means responsive to said plurality of first-step mapping outputs for generating a plurality of second-step mapping outputs; and comparing means responsive to said plurality of second-step mapping outputs and said input signal for comparing said second-step mapping outputs with said input signal to generate a plurality of distances, one of said first-step mapping output that results said second-step mapping output to have a minimum distance with said input signal being output as a final output.

2. The look-up table mapping apparatus according to claim 1, wherein said first-step mapping outputs comprise:

a direct first-step mapping output according to said portions of said input signal that is not cleared;

a next first-step mapping output of said direct first-step mapping output; and a last first-step mapping output of said direct first-step mapping output.

3. The look-up table mapping apparatus according to claim 1, wherein said first mapping means generates said first-step mapping outputs by using a monotone function.

4. The look-up table mapping apparatus according to claim 1, wherein said comparing means comprises:

distance providing means for generating a difference between each said second-step mapping output with said input signal, and for generating an absolute value of said difference as one of said plurality of distances;

minimum providing means for determining a minimum distance from said plurality of distances; and final output providing means for outputting one of said first-step outputs that results said second-step mapping output to have said minimum distance.

5. A look-up table mapping apparatus for reducing memory usage of a scanning apparatus, said mapping apparatus comprises:

masking means responsive to an input signal having two bytes for clearing a lower byte of said input signal, and for outputting an upper byte of said input signal;

first mapping means responsive to said upper byte of said input signal for generating a plurality of first-step mapping outputs;

second mapping means responsive to said plurality of first-step mapping outputs for generating a plurality of second-step mapping outputs; and comparing means responsive to said plurality of second-step mapping outputs and said input signal for comparing said second-step mapping outputs with said input signal to generate a plurality of distances, one of said first-step mapping output that results said second-step mapping output to have a minimum distance with said input signal being output as a final output.

6. The look-up table mapping apparatus according to claim 5, wherein said first-step mapping outputs comprise:

a direct first-step mapping output according to said upper byte of said input signal;

a next first-step mapping output of said direct first-step mapping output; and a last first-step mapping output of said direct first-step mapping output.

7. The look-up table mapping apparatus according to claim 5, wherein said first mapping means generates said first-step mapping outputs by using a monotone function.

8. The look-up table mapping apparatus according to claim 5, wherein said comparing means comprises:

distance providing means for generating a difference between each said second-step mapping output and said input signal, and for generating an absolute value of said difference as one of said plurality of distances;

minimum providing means for determining a minimum distance from said plurality of distances; and final output providing means for outputting said first-step output that results said second-step mapping output to have said minimum distance.

9. The mapping apparatus according to claim 8, said distance providing means further comprising subtracting means for generating said difference between each said second-step mapping output and said input signal.

10. A method for reducing memory usage by using a two-step mapping procedures in a scanning apparatus, comprising the steps of:

inputting an input signal;

masking said input signal to clear portions of said input signal;

generating a plurality of first-step mapping outputs by using said portions of said input signal that is not cleared;

generating a plurality of second-step mapping outputs by using said plurality of first-step mapping outputs;

generating a difference between each said second-step mapping output and said input signal;

generating an absolute value of each said difference to be a distance;

determining a minimum distance from said distances; and outputting one of said first-step mapping outputs that results said second-step mapping output that is mapped to have said minimum distance with said input signal.

11. The method according to claim 10, wherein said portions of said input signal that is not cleared is an upper byte of said input signal.

12. The method according to claim 10, wherein said first mapping means generates said first-step mapping outputs by using a first monotone function.

13. The method according to claim 10, wherein said second mapping means generates said second-step mapping outputs by using a second monotone function.

14. The method according to claim 13, wherein said first monotone function is an inverse function of said second monotone function.

15. The method according to claim 10, wherein said first-step mapping outputs comprise:

a direct first-step mapping output according to said portions of said input signal that is not cleared;

a next first-step mapping output of said direct first-step mapping output; and a last first-step mapping output of said direct first-step mapping output.

* * * * *